United States Patent Office 3,335,126
Patented Aug. 8, 1967

3,335,126
MONOAZO DYESTUFFS
Thomas Douglas Baron and Brian Ribbons Fishwick, Manchester, England, assignors to Imperial Chemical Industries Limited, London, England, a corporation of Great Britain
No Drawing. Filed Nov. 2, 1964, Ser. No. 408,365
Claims priority, application Great Britain, Nov. 14, 1963, 45,046/63
3 Claims. (Cl. 260—207.1)

This invention relates to new monoazo dyestuffs and more particularly it relates to new water-insoluble monoazo dyestuffs which are valuable for colouring synthetic textile materials, in particular polyester textile materials.

According to the invention there are provided the water-insoluble monoazo dyestuffs of the formula:

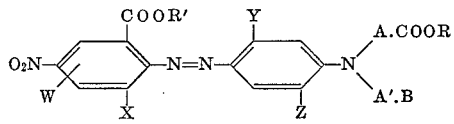

wherein
A and A' each independently represent lower alkylene radicals;
B represents a hydrogen atom or a cyano, hydroxy or —COOR radical;
R represents a hydrogen atom or a lower alkyl or hydroxy lower alkyl radical;
Z represents a hydrogen atom or a lower alkyl or lower alkoxy radical;
Y represents a hydrogen, chlorine or bromine atom or a lower alkyl, lower alkoxy or —NH acyl radical, wherein acyl is the radical of a carboxylic, carbamic or organic carbonic acid;
W represents a hydrogen atom or a —COOR' radical;
X represents a hydrogen, chlorine or bromine atom or a nitro group, or when W represents a hydrogen atom X may also represent a —COOR' radical; and
R' represents a lower alkyl, hydroxy lower alkyl, chloro lower alkyl, bromo lower alkyl or lower alkoxy lower alkyl radical.

The lower alkylene radicals represented by A and A' are alkylene radicals containing not more than 6 carbon atoms such as methylene, trimethylene, propylene, tetramethylene, α:β-dimethylethylene and, preferably, ethylene radicals.

Throughout this specification the terms "lower alkyl" and "lower alkoxy" are used to denote alkyl and alkoxy radicals respectively of low molecular weight, in particular alkyl and alkoxy radicals containing from 1 to 4 carbon atoms.

As examples of the radicals represented by R there may be mentioned methyl, ethyl, propyl, butyl, β-hydroxyethyl and β- or γ-hydroxypropyl radicals: it is however preferred that R represents a lower alkyl radical.

As examples of the radicals represented by R' there may be mentioned methyl, ethyl, propyl, butyl, β-hydroxyethyl, β- or γ-hydroxypropyl, β-chloroethyl, β-bromoethyl, β-methoxyethyl, β-ethoxyethyl, γ-methoxypropyl and γ-ethoxypropyl radicals: it is however preferred that R' represents a lower alkyl radical.

As examples of the lower alkyl radicals represented by Z and Y there may be mentioned ethyl, propyl and preferably methyl radicals; and as examples of the lower alkoxy radicals represented by Z and Y there may be mentioned ethoxy, propoxy and preferably methoxy radicals. As examples of the acyl radicals present in the —NH acyl radical represented by Y there may be mentioned acyl radicals derived from aliphatic carboxylic acids, in particular lower aliphatic carboxylic acids such as formic acid, acetic acid, propionic acid and butyric acid, which, if desired, may contain substituents such as chlorine atoms or cyano, lower alkoxy such as methoxy, or carbo lower alkoxy such as carbomethoxy groups; acyl radicals derived from monocyclic aromatic carboxylic acids such as benzoic acid or toluic acid which may, if desired, contain substituents such as chlorine or bromine atoms or nitro, lower alkoxy such as methoxy, carbo lower alkoxy such as carbomethoxy, and acylamino such as acetylamino groups; acyl radicals derived from carbamic acids such as aminocarbonyl, N-lower alkyl aminocarbonyl and phenylcarbonyl radicals; and acyl radicals derived from organic carbonic acids such as lower alkoxy carbonyl and phenoxycarbonyl radicals.

It is however preferred that the acylamino group represented by Y is a group of the formula: —NHCOR⁴ wherein R⁴ represents a hydrogen atom or a lower alkyl radical.

It is also preferred that W represents a hydrogen atom; and also that B represents a —CN or —COOR radical.

According to a further feature of the invention there is provided a process for the manufacture of the water-insoluble monoazo dyestuffs, as hereinbefore defined, which comprises coupling a diazotised primary amine of the formula

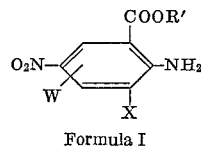

Formula I with a coupling component of the formula:

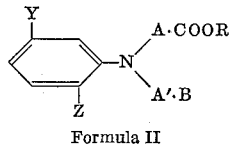

Formula II wherein A, A', B, R, R', W, X, Y and Z have the meanings stated above.

The process of the invention may be conveniently brought out by adding an aqueous solution or suspension of the diazotised primary amine to a solution of the coupling component in a dilute aqueous solution of an acid such as hydrochloric acid, stirring the resulting mixture, preferably at a pH between 3 and 7, to effect formation of the monoazo dyestuff, and finally isolating the monoazo dyestuff by conventional methods.

As specific examples of the primary amines of Formula I there may be mentioned methyl 2-amino-5-nitrobenzoate,
methyl 2-amino-3-(chloro- or bromo-)-5-nitrobenzoate,
methyl 2-amino-3:5-dinitrobenzoate,
ethyl 2-amino-3:5-dinitrobenzoate,
n-propyl 2-amino-3:5-dinitrobenzoate,
β-chloroethyl 2-amino-5-nitrobenzoate,
β-bromoethyl 2-amino-5-nitrobenzoate,
β-hydroxypropyl 2-amino-5-nitrobenzoate,
β-methoxyethyl 2-amino-5-nitrobenzoate,
dimethyl 2-amino-5-nitroisophthalate,
dimethyl 2-amino-5-nitroterephthlate and
dimethyl 3-amino-6-nitrophthalate.

The coupling components of Formula II may themselves be obtained by reacting a secondary amine of the formula:

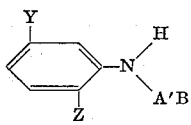

with the appropriate ester of a chloro- or bromo-lower aliphatic carboxylic acid, or by reacting a secondary amine of the formula:

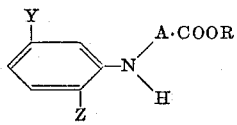

with a compound of the formula: Cl.A'B.

As specific examples of the coupling components of Formula II there may be mentioned N-(β-cyanoethyl)-N-(β-carboxyethyl)aniline,
N-ethyl-N-(β-methoxycarbonylethyl)aniline,
N-(β-hydroxyethyl)-N-(β-ethoxycarbonylethyl)aniline,
N:N-bis(β-methoxycarbonylethyl)aniline,
2:5-dimethyl-N:N-bis(γ-methoxycarbonylpropyl)aniline,
2:5-dimethoxy-N:N-bis(β-ethoxycarbonylethyl)aniline,
2-methoxy-5-methyl-N(β-cyanoethyl)-N-(β-methoxycarbonylethyl)aniline,
N-(β-cyanoethyl)-N-(β-ethoxycarbonylethyl)-m-(chloro- or bromo-)aniline,
N:N-bis-(β-ethoxycarbonylethyl)-m-aminoacetanilide,
2-methoxy-5-propionylamino-N:N-bis-(β-methoxycarbonylethyl)aniline and
2-methyl-5-formylamino-N-(β-cyanoethyl)-N-(β-methoxycarbonylethyl)aniline.

The monoazo dyestuffs, as hereinbefore defined, are valuable for colouring synthetic textile materials, for example cellulose acetate textile materials such as secondary cellulose acetate and cellulose triacetate textile materials, polyamide textile materials such as polyhexamethyleneadipamide textile materials, and preferably aromatic polyester textile materials such as polyethylene terephthalate textile materials. Such textile materials can be be in the form of thread, yarn, or woven or knitted fabric.

Such textile materials can conveniently be coloured with the monoazo dyestuffs, as hereinbefore defined, by immersing the textile material in a dyebath comprising an aqueous dispersion of one or more of the said dyestuffs, which dyebath preferably contains a non-ionic, cationic and/or anionic surface-active agent, and thereafter heating the dyebath for a period at a suitable temperature. In the case of secondary cellulose acetate textile materials it is preferred to carry out the dyeing process at a temperature between 60° and 85° C.; in the case of cellulose triacetate or polyamide textile material it is preferred to carry out the dyeing process at 95° to 100° C.; in the case of aromatic polyester textile materials the dyeing process can either be carried out at a temperature between 90° and 100 °C., preferably in the presence of a carrier such as diphenyl or o-hydroxydiphenyl, or at a temperature above 100° C., preferably at a temperature between 120° and 130° C., under superatmospheric pressure.

Alternatively the aqueous dispersion of the said monoazo dyestuff can be applied to the textile material by a padding or printing process, followed by heating or steaming of the textile material. In such processes it is preferred to incorporate a thickening agent, such as gum tragacanth, gum arabic or sodium alginate, into the aqueous dispersion of the said monoazo dyestuff.

At the conclusion of the colouring process it is preferred to give the coloured textile material a rinse in water or a brief soaping treatment before finally drying the coloured textile material. In the case of aromatic polyester textile materials it is also preferred to subject the coloured textile material to a treatment in an alkaline aqueous solution of sodium hydrosulphite before the soaping treatment in order to remove loosely attached dyestuff from the surface of the textile material.

The monoazo dyestuffs have excellent affinity and building up properties on synthetic textile materials, and in particular on aromatic polyester textile materials, so enabling deep shades to be obtained. The resulting colourations which range in shade from orange to blue, have excellent fastness to light, to wet treatments, and, in particular, to dry heat treatments such as those carried out at high temperatures during pleating operations.

One preferred class of the monoazo dyestuffs of the invention comprises the monoazo dyestuffs of the formula:

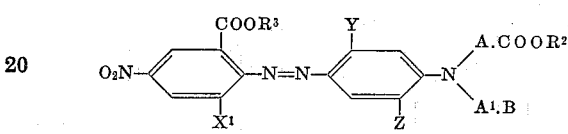

wherein A, A¹, B, Y and Z have the meanings stated, R² and R³ each independently represent lower alkyl radicals, and X¹ represents a hydrogen, chlorine or bromine atom or a nitro group. The dyestuffs of this class have good build up properties on polyethylene terephthalate textile materials and the resulting colourations have excellent fastness properties.

A second preferred class of the monoazo dyestuffs of the invention comprises the monoazo dyestuffs of the formula:

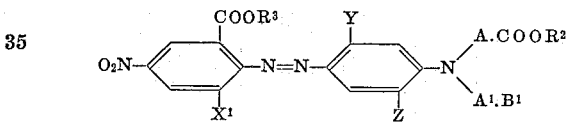

wherein A, A¹, Y, Z, R², R³ and X¹ have the meanings stated and B¹ represents —CN or —COOR².

The dyestuffs of this class when applied to polyethylene terephthalate textile materials yield colourations having excellent fastness to light.

A third preferred class of the monoazo dyestuffs of the invention comprises the monoazo dyestuffs of the formula:

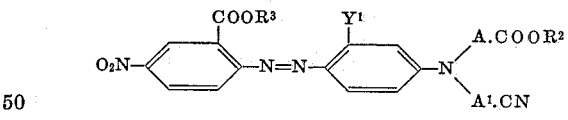

wherein A, A¹, R² and R³ have the meanings stated and Y¹ represents a hydrogen, chlorine or bromine atom or a lower alkyl radical.

The dyestuffs of this class have excellent build up properties on polyethylene terephthalate textile materials and the resulting colourations have excellent fastness to light.

A fourth preferred class of the monoazo dyestuffs of the invention comprises the monoazo dyestuffs of the formula:

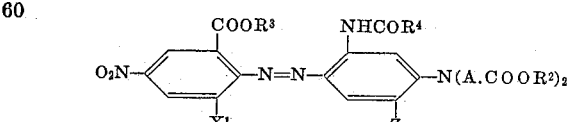

wherein A, R², R³, X¹ and Z have the meanings stated and R⁴ represents a hydrogen atom or a lower alkyl radical.

The dyestuffs of this class have excellent build-up properties on polyethylene terephthalate textile materials and the resulting colourations have excellent fastness to dry heat treatments.

It is also preferred that A and A¹ represent ethylene radicals.

The invention is illustrated but not limited by the following examples in which the parts are by weight.

Example 1

To a warm solution of 1.96 parts of methyl 2-amino-5-nitrobenzoate in 10 parts of acetic acid there are added, with stirring, 2.3 parts of 10 N hydrochloric acid. The mixture is cooled to 10° C. and a cooled solution of 0.71 part of sodium nitrite in 5 parts of water is quickly added. The mixture is stirred between 5° C. and 10° C. for 10 minutes and any excess nitrous acid is destroyed by adding sulphamic acid.

The diazo solution so obtained is added during 15 minutes to a solution of 2.32 parts of N-(β-cyanoethyl)-N-(β-methoxycarbonylethyl)aniline in a mixture of 50 parts of water, 6 parts of a 2 N aqueous solution of hydrochloric acid and 50 parts of acetone. The mixture is stirred for 6 hours, sodium acetate solution is added to raise the pH to about 4 and stirring is continued for a further 24 hours. The dyestuff is then filtered off, reslurried in water and the slurry is basified by addition of sodium carbonate. The product is then refiltered, washed with water and dried. After recrystallisation from butanol, it has a melting point of 90° C.

Example 2

A dyebath is prepared by milling 1 part of the dyestuff of Example 1 with 80 parts of water containing 3 parts of the sodium salt of a sulphonated naphthalene-formaldehyde condensate, and adding the dispersion so obtained in 4000 parts of water containing 1 part oleyl sodium sulphate. 100 parts of polyethylene terephthalate fabric is placed in the dyebath which is then heated to 130° C. for 30 minutes in a closed vessel. The polyethylene terephthalate fabric is then rinsed in water and immersed for 15 minutes at 50° C. in an aqueous solution containing 0.2% sodium hydroxide, 0.2% sodium hydrosulphite and 0.1% cetyl trimethyl ammonium bromide. The fabric is again rinsed in water and then immersed for 15 minutes in a warm aqueous solution of a synthetic detergent, rinsed in water and dried.

The polyethylene terephthalate fabric is dyed an orange shade having good fastness to heat treatments and to light.

The following table gives further examples of monoazo dyestuffs of the invention which are obtained by diazotising the amines listed in the second column of the table and coupling the resulting diazo compounds with the coupling components listed in the third column of the table by methods similar to that described in Example 1. The fourth column of the table indicates the shades obtained when the resulting dyestuffs are applied to polyethylene terephthalate textile materials by methods similar to that described in Example 2.

| Ex. | Amine | Coupling Component | Shade |
| --- | --- | --- | --- |
| 3 | Methyl 2-amino-5-nitrobenzoate | N-(β-cyanoethyl)-N-(β-carboxyethyl)aniline | Orange. |
| 4 | do | N-(β-cyanoethyl)-N-(β-ethoxycarbonylethyl)aniline | Do. |
| 5 | Dimethyl 2-amino-5-nitroterephthalate | N-(β-cyanoethyl)-N-(β-methoxycarbonylethyl)-aniline | Reddish orange. |
| 6 | Ethyl 2-amino-5-nitrobenzoate | do | Orange. |
| 7 | β-Chloroethyl 2-amino-5-nitrobenzoate | do | Do. |
| 8 | do | N-(β-cyanoethyl)-N-(β-ethoxycarbonylethyl)-aniline | Do. |
| 9 | Ethyl 2-amino-5-nitrobenzoate | do | Do. |
| 10 | n-Butyl 2-amino-5-nitrobenzoate | N-(β-cyanoethyl)-N-(β-methoxycarbonylethyl)-aniline | Do. |
| 11 | β-Methoxyethyl 2-amino-5-nitrobenzoate | do | Do. |
| 12 | β-Hydroxyethyl 2-amino-5-nitrobenzoate | do | Do. |
| 13 | Dimethyl 2-amino-5-nitroisophthalate | do | Orange-brown. |
| 14 | Methyl 2-amino-5-nitrobenzoate | N-(β-cyanoethyl)-N-(β-ethyxocarbonylethyl)-m-toluidine | Reddish-Orange. |
| 15 | do | N-(β-cyanoethyl)-N-(β-methoxycarbonylethyl)-m-chloroaniline | Orange. |
| 16 | do | N-(β-cyanoethyl-N-(β-methoxycarbonylethyl)-m-bromoaniline | Do. |
| 17 | do | N:N-bis(β-methoxycarbonylethyl)aniline | Reddish-orange. |
| 18 | do | N:N-bis(β-methoxycarbonylethyl)-m-toluidine | Red. |
| 19 | do | N:N-bis(β-methoxycarbonylethyl)-m-chloroaniline | Orange. |
| 20 | do | N:N-bis(β-methoxycarbonylethyl)-m-aminoacetanilide | Bluish-red. |
| 21 | do | N:N-bis(β-ethoxycarbonylethyl)-m-aminoacetanilide | Do. |
| 22 | do | N:N-bis(β-methoxycarbonylethyl)-m-aminoformanilide | Do. |
| 23 | do | N-ethyl-N-(β-methoxycarbonylethyl)aniline | Scarlet. |
| 24 | Methyl 2-amino-5-nitrobenzoate | N-ethyl-N-(n-butoxycarbonylethyl)aniline | Do. |
| 25 | do | N:N-bis-(β-methoxycarbonylethyl)-m-anisidine | Red. |
| 26 | do | N:N-bis-[β-(β'-hydroxyethylcarbonyl)ethyl]aniline | Reddish-orange. |
| 27 | do | N-(β-hydroxyethyl)-N-(β-methoxycarbonylethyl)aniline | Do. |
| 28 | do | N-(γ-hydroxypropyl)-N-(β-methoxycarbonylethyl)aniline | Do. |
| 29 | do | N-cyanomethyl-N-(β-methoxycarbonylethyl)aniline | Orange. |
| 30 | do | N:N-bis(methoxycarbonylmethyl)aniline | Do. |
| 31 | Dimethyl 2-amino-5-nitrophthalate | N-(β-cyanoethyl)-N-(β-methoxycarbonylethyl)aniline | Do. |
| 32 | Methyl 2-amino-5-nitrobenzoate | N-(β-cyanoethyl)-N-(β-methoxycarbonylethyl)-m-ethylaniline | Reddish-orange. |
| 33 | do | N-(β-cyanoethyl)-N-(β-methoxycarbonylethyl)-m-phenetidine | Do. |
| 34 | do | N-(β-cyanobutyl)-N-(β-methoxycarbonylethyl)aniline | Orange. |
| 35 | do | N-(β-cyanoethyl)-N-(γ-methoxycarbonylpropyl)aniline | Do. |
| 36 | do | N-(β-cyanoethyl)-N-(δ-methoxycarbonylbutyl)aniline | Do. |
| 37 | do | N-(β-cyanoethyl-N-[β-(β':γ'-dihydroxypropylcarbonyl)ethyl]aniline | Do. |

Example 38

2.75 parts of methyl 2-amino-3-bromo-5-nitrobenzoate are gradually added to 15 parts of nitrosyl sulphuric acid (which is obtained by adding 1 part of sodium nitrite to 14 parts of sulphuric acid) at 20° to 25° C., and the mixture is then cooled to 0° C. 130 parts of an aqueous solution of phosphoric acid of specific gravity 1.65 are then added over 1 hour, the temperature being maintained between 0° and 5° C. by external cooling. The mixture is stirred for a further hour at 0° C., and 0.5 part of urea is then added. The resulting solution of the diazo compound is then added to a solution of 3.52 parts of 2-methoxy - 5 - acetylamino - N:N-bis(β-methoxycarbonylethyl)aniline in a mixture of 60 parts of acetone and 60 parts of a 0.2 N aqueous solution of hydrochloric acid at 5° C. The mixture is stirred for 1 hour at 5° to 10° C., 600 parts of water are added, and the precipitated dyestuff is filtered off, washed with water and dried.

When dispersed in aqueous medium the dyestuff so obtained dyes polyethylene terephthalate textile materials in violet shades possessing excellent fastness properties.

The following table gives further examples of the monoazo dyestuffs of the invention which are obtained by diazotising the amines listed in the second column of the table and coupling the resulting diazo compounds with the coupling components listed in the third column of the table by methods similar to that described in Example 38. The fourth column of the table indicates the shades obtained when the resulting monoazo dyestuffs are applied to polyethylene terephthalate textile materials by methods similar to that described in Example 2.

| Ex. | Amine | Coupling Component | Shade |
|---|---|---|---|
| 39 | Methyl 2-amino-3:5-dinitrobenzoate | 2-methoxy-5-acetylamino-N:N-bis-(β-methoxycarbonylethyl)aniline | Navy-blue. |
| 40 | ----do---- | 2-methoxy-5-formylamino-N:N-bis-(β-methoxycarbonylethyl)aniline | Reddish-navy. |
| 41 | Methyl 2-amino-3-bromo-5-nitrobenzoate | ----do---- | Reddish-violet. |
| 42 | Methyl 2-amino-3-chloro-5-nitrobenzoate | 2-methoxy-5-acetylamino-N:N-bis-(β-methoxycarbonylethyl)aniline | Do. |
| 43 | n-Propyl-2-amino-3:5-dinitrobenzoate | ----do---- | Navy blue. |
| 44 | β-Methoxyethyl 2-amino-3:5-dinitrobenzoate | ----do---- | Do. |
| 45 | Methyl 2-amino-3:5-dinitrobenzoate | 2-methyl-5-acetylamino-N:N-bis-(β-ethoxycarbonylethyl)aniline | Violet. |
| 46 | ----do---- | 2-methoxy-5-acetylamino-N:N-bis-(β-ethoxycarbonylethyl)aniline | Navy blue. |
| 47 | ----do---- | 2-ethoxy-5-formylamino-N:N-bis-(β-methoxyethyl)aniline | Do. |
| 48 | ----do---- | 2-methoxy-5-propionylamino-N:N-bis-(β-methoxycarbonylethyl)aniline | Do. |
| 49 | ----do---- | 2-methoxy-5-benzoylamino-N:N-bis-(β-methoxycarbonylethyl)aniline | Do. |
| 50 | Methyl 2-amino-3:5-dinitrobenzoate | 2-methoxy-5-methoxycarbonamido-N:N-bis-(β-methoxycarbonylethyl)aniline. | Navy blue. |
| 51 | ----do---- | 2-methoxy-5-ureido-N:N-bis-(β-methoxycarbonylethyl)-aniline | Do. |
| 52 | ----do---- | 2-ethyl-5-acetylamino-N:N-bis-(β-methoxycarbonylethyl)-aniline | Violet. |
| 53 | n-Butyl 2-amino-3:5-dinitrobenzoate | 2-methoxy-5-acetylamino-N:N-bis-(β-methoxycarbonylethyl)aniline | Navy blue. |
| 54 | Methyl 2-amino-3:5-dinitrobenzoate | 2-methoxy-5-(p-methoxybenzoylamino)-N:N-bis-(β-methoxycarbonylethyl)aniline. | Do. |
| 55 | ----do---- | 2-methoxy-5-(2':4'-dimethoxybenzoylamino)-N:N-bis-(β-methoxycarbonylethyl)aniline. | Do. |
| 56 | ----do---- | 2-methoxy-5-(m-nitrobenzoylamino)-N:N-bis-(β-methoxycarbonylethyl)aniline. | Do. |
| 57 | ----do---- | 2-methoxy-5-(m-acetylaminobenzoylamino)-N:N-bis-(β-methoxycarbonylethyl)aniline. | Do. |
| 58 | ----do---- | 2-methoxy-5-(p-bromobenzoylamino)-N:N-bis-(β-methoxycarbonylethyl)aniline. | Do. |
| 59 | Methyl 2-amino-3:5-dinitrobenzoate | 2-methoxy-5-(o-chlorobenzoylamino)-N:N-bis-(β-methoxycarbonylethyl)aniline. | Do. |
| 60 | ----do---- | 2-methoxy-5-(p-methoxycarbonylbenzoylamino)-N:N-bis-(β-methoxycarbonylethyl)aniline. | Do. |
| 61 | ----do---- | 2-methoxy-5-n-butyrylamino-N:N-bis-(β-methoxycarbonylethyl)aniline. | Do. |
| 62 | ----do---- | 2-methoxy-5-trichloroacetylamino-N:N-bis-(β-methoxyethyl)aniline | Do. |
| 63 | ----do---- | 2-methoxy-5-methoxyacetylamino-N:N-bis-(β-methoxycarbonylethyl)aniline. | Do. |
| 64 | ----do---- | 2-methoxy-5-(β-cyanopropionylamino)-N:N-bis-(β-methoxycarbonylethyl)aniline. | Do. |
| 65 | ----do---- | 2-methoxy-5-methyloxalylamino-N:N-bis-(β-methoxycarbonyl)aniline. | Do. |
| 66 | β-Chloroethyl-2-amino-3:5-dinitrobenzoate | 2-methoxy-5-acetylamino-N:N-bis-(β-methoxycarbonylethyl)aniline | Do. |
| 67 | β-Ethoxyethyl-2-amino-3:5-dinitrobenzoate | ----do---- | Do. |
| 68 | β-Bromoethyl 2-amino-3:5-dinitrobenzoate | ----do---- | Do. |

What we claim is:

1. The water-insoluble monoazo dyestuffs of the formula:

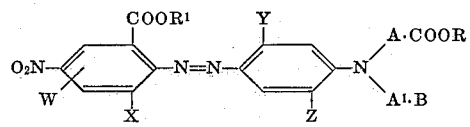

wherein
A and A¹ each independently represent lower alkylene radicals;
B is selected from the class consisting of hydrogen, cyano, hydroxy and groups of the formula —COOR;
R is selected from the class consisting of hydrogen, lower alkyl and hydroxy lower alkyl;
Z is selected from the class consisting of hydrogen, lower alkyl and lower alkoxy;
Y is selected from the class consisting of hydrogen, chlorine, bromine, lower alkyl, lower alkoxy and acylamino, and acyl is the acyl radical of an acid selected from the class consisting of lower aliphatic carboxylic acids, chloro lower aliphatic carboxylic acids, cyano lower aliphatic carboxylic acids, lower alkoxy lower aliphatic carboxylic acids, carbo lower alkoxy aliphatic carboxylic acids, benzoic acid, chlorobenzoic acids, bromobenzoic acids, methoxybenzoic acids, nitrobenzoic acids, lower alkoxy benzoic acids, carbo lower alkoxy benzoic acids, acetylamino benzoic acids, aminocarbamic acid, N-lower alkyl aminocarbamic acids, N-phenylamino carbamic acid, lower alkoxy carboxylic acids and phenoxy carboxylic acid;
W is selected from the class consisting of a hydrogen atom and a —COOR' group;
R' is selected from the class consisting of lower alkyl, hydroxy lower alkyl, chloro lower alkyl, bromo lower alkyl and lower alkoxy lower alkyl;
and X is selected from the class consisting of hydrogen, chlorine, bromine and nitro, and when W represents a hydrogen atom X may also represent a —COOR' radical.

2. The water-insoluble monoazo dyestuffs of the formula:

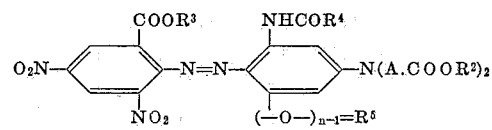

wherein R², R³, R⁴ and R⁵ each independently represent lower alkyl, and n is a positive integer not exceeding 2, and A represents lower alkylene.

3. The water-insoluble monoazo dyestuffs of the formula:

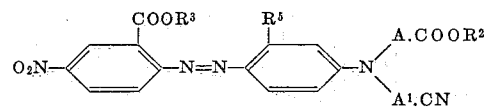

wherein R², R³ and R⁵ each independently represent lower alkyl, and A and A¹ each independently represent lower alkylene.

References Cited

FOREIGN PATENTS 910,306   11/1962   Great Britain.
913,899   12/1962   Great Britain.

CHARLES B. PARKER, *Primary Examiner.*

D. M. PAPUGA, *Assistant Examiner.*